United States Patent
Tanizawa

(10) Patent No.: US 10,623,180 B2
(45) Date of Patent: Apr. 14, 2020

(54) COMMUNICATION DEVICE, COMMUNICATION METHOD, AND COMMUNICATION SYSTEM

(71) Applicant: Kabushiki Kaisha Toshiba, Minato-ku (JP)

(72) Inventor: Yoshimichi Tanizawa, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 299 days.

(21) Appl. No.: 15/433,318

(22) Filed: Feb. 15, 2017

(65) Prior Publication Data
US 2018/0054304 A1 Feb. 22, 2018

(30) Foreign Application Priority Data
Aug. 19, 2016 (JP) .................. 2016-161150

(51) Int. Cl.
*H04L 9/08* (2006.01)
*H04L 12/815* (2013.01)
(Continued)

(52) U.S. Cl.
CPC .......... *H04L 9/0827* (2013.01); *H04L 9/0852* (2013.01); *H04L 9/3213* (2013.01)

(58) Field of Classification Search
CPC ... H04L 9/0827; H04L 9/0852; H04L 9/3213; H04L 63/06; H04L 63/10; H04L 47/10; H04W 28/02
See application file for complete search history.

(56) References Cited

U.S. PATENT DOCUMENTS

| 6,970,426 B1* | 11/2005 | Haddock | H04L 47/10 370/233 |
| 7,586,848 B1* | 9/2009 | Gunduzhan | H04L 47/10 370/235 |

(Continued)

FOREIGN PATENT DOCUMENTS

JP 4015385 11/2007
WO WO 2015/048783 A1 4/2015

OTHER PUBLICATIONS

Yi-Chiun Chen and Xiao Xu, "An adaptive buffer allocation mechanism for token bucket flow control," IEEE 60th Vehicular Technology Conference, 2004. VTC2004-Fall. 2004, Los Angeles, CA, 2004, pp. 3020-3024 vol. 4. (Year: 2004).*

(Continued)

*Primary Examiner* — Jung W Kim
*Assistant Examiner* — Sameera Wickramasuriya
(74) *Attorney, Agent, or Firm* — Oblon, McClelland, Maier & Neustadt, L.L.P.

(57) ABSTRACT

A communication device includes a providing unit, a flow control unit, and a cryptography processing unit. The providing unit provides a cryptographic key generated using quantum key distribution technology. The flow control unit, if the cryptographic key has not been provided at time of reception of target data for cryptography processing, performs, with respect to the received data, an operation selected from among a first operation of destroying the data, a second operation of holding the data, and a third operation of attaching, to the data, information indicating that the cryptographic key has not been provided, and then outputting the data. The cryptography processing unit, with respect to data output from the flow control unit, performs the cryptography processing using the cryptographic key.

7 Claims, 8 Drawing Sheets

(51) Int. Cl.
*H04L 12/819* (2013.01)
*H04L 9/32* (2006.01)

(56) References Cited

U.S. PATENT DOCUMENTS

| | | | | |
|---|---|---|---|---|
| 7,864,354 B2* | 1/2011 | Shahindoust | ...... | H04N 1/00233 358/1.14 |
| 2004/0059908 A1* | 3/2004 | Yamada | ...... | H04L 9/003 713/151 |
| 2004/0125815 A1* | 7/2004 | Shimazu | ...... | H04L 47/10 370/411 |
| 2005/0083845 A1* | 4/2005 | Compton | ...... | H04L 47/10 370/235 |
| 2006/0062392 A1* | 3/2006 | Lee | ...... | H04L 9/0852 380/278 |
| 2009/0013175 A1* | 1/2009 | Elliott | ...... | H04L 63/0428 713/154 |
| 2010/0085874 A1* | 4/2010 | Noy | ...... | H04L 47/10 370/230 |
| 2010/0177635 A1* | 7/2010 | Figueira | ...... | H04L 47/10 370/230 |
| 2012/0176899 A1* | 7/2012 | Compton | ...... | H04L 47/10 370/235 |
| 2012/0254626 A1* | 10/2012 | Arai | ...... | G06F 21/79 713/189 |
| 2014/0044260 A1* | 2/2014 | Baba | ...... | H04L 9/0861 380/255 |
| 2015/0271147 A1 | 9/2015 | Tanizawa et al. | | |

OTHER PUBLICATIONS

Tsern-Huei Lee, "Correlated token bucket shapers for multiple traffic classes," IEEE 60th Vehicular Technology Conference, 2004. VTC2004-Fall. 2004, Los Angeles, CA, 2004, pp. 4672-4676 vol. 7. (Year: 2004).*

Xiaxiang Lin, et al."An implementation of Post-Processing Software in Quantum Key Distribution," World Congress on Computer Science and Information Engineering, vol. 3, 2009, pp. 243-247.

* cited by examiner

COMMUNICATION DEVICE, COMMUNICATION METHOD, AND COMMUNICATION SYSTEM

CROSS-REFERENCE TO RELATED APPLICATIONS

This application is based upon and claims the benefit of priority from Japanese Patent Application No. 2016-161150, filed on Aug. 19, 2016; the entire contents of which are incorporated herein by reference.

FIELD

Embodiments described herein relate generally to a communication device, a communication method, and a communication system.

BACKGROUND

The quantum key distribution (QKD) technology is a technology in which keys enabling cryptographic data communication are shared in safety between a transmission node (a quantum key distribution system transmitter), which successively transmits single photons, and a reception node (a quantum key distribution system receiver), which receives single photons.

In a communication system in which quantum cryptography is used, there are times when the generation rate for generating keys and the arrival rate of the transmitted and received data undergoes fluctuation. In such a situation too, it is necessary to configure a secure communication system to a maximum extent using the finite resources (such as memory resources and communication resources).

DETAILED DESCRIPTION

According to one embodiment, a communication device includes a providing unit, a flow control unit, and a cryptography processing unit. The providing unit provides a cryptographic key generated using quantum key distribution technology. The flow control unit, if the cryptographic key has not been provided at time of reception of target data for cryptography processing, performs, with respect to the received data, an operation selected from among a first operation of destroying the data, a second operation of holding the data, and a third operation of attaching, to the data, information indicating that the cryptographic key has not been provided, and then outputting the data. The cryptography processing unit, with respect to data output from the flow control unit, performs the cryptography processing using the cryptographic key.

Exemplary embodiments of a communication device according to the invention are described below in detail with reference to the accompanying drawings.

Firstly, the explanation is given about a system in which the QKD technology is implemented. In order to share keys in the QKD technology, the transmission of photons needs to be followed by what is called key distillation in which exchange of control data via a classical communication channel is performed between the transmission node (the quantum key distribution system transmitter) and the reception node (the quantum key distribution system receiver). Herein, a key represents shared information that is shared between a transmission node and a reception node, and represents a random number sequence made of digital data. The transmission node and the reception node are collectively referred to as nodes. Based on the principles of quantum mechanics, it is guaranteed that the keys shared using the QKD technology do not get wiretapped.

A system that performs cryptographic communication using the keys shared by a quantum key distribution system is hereinafter called a quantum-cryptography communication system.

Figure 1:
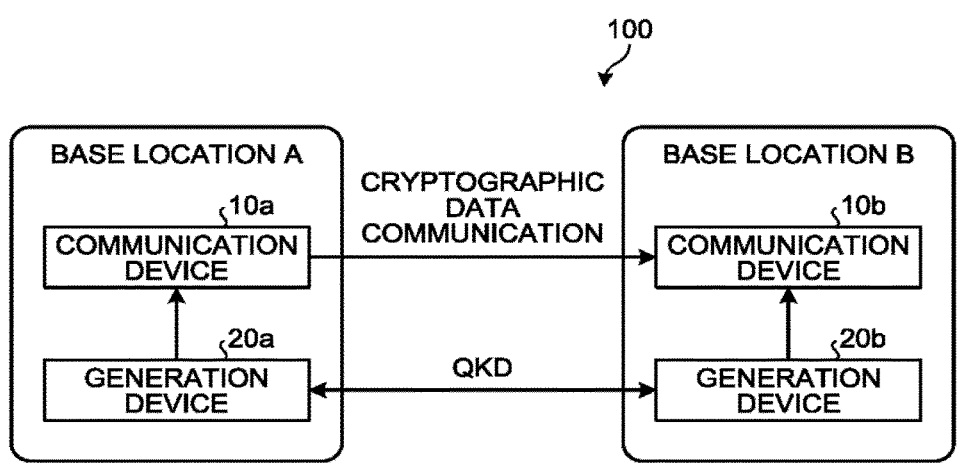
FIG. 1 is a diagram illustrating an exemplary device configuration of a communication system according to embodiments.

FIG. 1 is a diagram illustrating an exemplary device configuration of a communication system 100, which is a quantum-cryptography communication system, according to the embodiments. The communication system 100 includes communication devices 10a and 10b, and includes generation devices 20a and 20b. The communication device 10a and the generation device 20a are installed at a base location A. The communication device 10b and the generation device 20b are installed at a base location B. The communication system 100 according to the embodiments is a communication system in which communication between the base locations A and B is performed using encrypted data.

In the description of the embodiment, the explanation is given about an example in which the communication device 10a encrypts data and the communication device 10b decrypts the encrypted data. Alternatively, the communication device 10b may encrypt data and the communication device 10a may decrypt the encrypted data.

The communication device 10a encrypts data using a shared key generated by the generation device 20a, and transmits the encrypted data to the communication device 10b. Herein, the method of communication of the encrypted data either can be wired communication, or can be wireless communication, or can be a combination of wired communication and wireless communication. Examples of the method of communication of the encrypted data include Ethernet (registered trademark). The communication device 10b decrypts the encrypted data using a shared key generated by the generation device 20b.

The generation devices 20a and 20b generate shared keys, which are shared with each other, using quantum key distribution.

In the following explanation, in the case of not distinguishing the communication device 10a from the communication device 10b, they are simply referred to as the communication device 10. In an identical manner, in the case of not distinguishing the generation device 20a from the generation device 20b, they are simply referred to as the generation device 20.

A key shared by the quantum key distribution system has an extremely high degree of safety and is guaranteed to be safe from being wiretapped. For that reason, as a result of performing cryptographic communication using key data, it becomes possible to perform highly secure communication. Herein, it is possible to implement any cryptographic algorithm such as the advanced encryption standard (AES) or the one-time pad (OTP).

If cryptographic data communication is performed using the cryptographic communication method called the OTP, it is guaranteed according to the information theory that no wiretapper having whatever knowledge can decipher the cryptographic data. The OTP is a method in which encryption and decryption is performed using keys having the same length as the length of the transmitted and received data, and a key when used once is thrown away without reusing it. In the OTP, the key used as the encryption key in one node needs to be used as the decryption key in the other node. Consider a case in which cryptographic data transmission is performed from the transmission node to the reception node and cryptographic data transmission is performed from the reception node to the transmission node, that is, consider a case in which full-duplex cryptographic data communication is performed. In that case, the entire system needs be controlled in such a way that, from among the keys shared between the nodes, a key used as the encryption key in one node is used as the decryption key in the other node or a key used as the decryption key in one node is used as the encryption key in the other node. Such control is hereinafter called key assignment.

In the case of using block encryption such as the AES, although the safety according to the information theory is not satisfied, the practical communication security can be maintained at an extremely high level by increasing the frequency of updating cryptographic keys. In the AES, typically, the side that performs encryption before transmission as well as the side that performs decryption after reception performs operations based on identical key data. Hence, the key assignment explained above is not always necessary.

Given below is the explanation of an exemplary method for generating shared keys using quantum key distribution.

Figure 2:
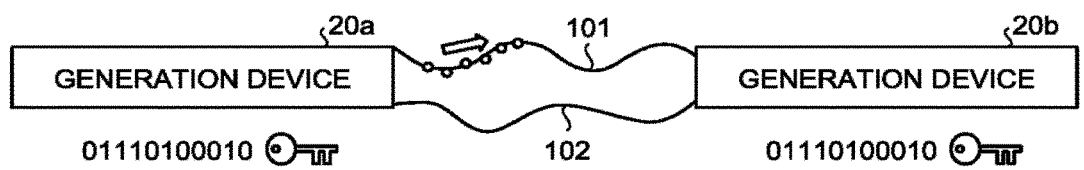
FIG. 2 is a diagram for explaining an exemplary method for generating shared keys according to the embodiments.

FIG. 2 is a diagram for explaining an exemplary method for generating shared keys according to the embodiments. The generation devices 20a and 20b are connected by a quantum communication channel 101 and a classical communication channel 102.

The quantum communication channel 101 transmits photon strings made of single photons indicating 0 or 1. Examples of the quantum communication channel 101 include an optical fiber link.

The classical communication channel 102 is used to transmit data. The data transmitted via the classical communication channel 102 represents, for example, control data of a key distillation operation (i.e., a shifting operation, an error correction operation, and a key compression operation) performed by the generation devices 20a and 20b. The classical communication channel 102 either can be a wired channel, or can be a wireless channel, or can be a combination of a wired channel and a wireless channel. Examples of the classical communication channel 102 include Ethernet (registered trademark).

The generation devices 20a and 20b generate shared keys, which are to be shared with each other, using quantum key distribution. A shared key is a random number represented by a string of digital data indicating 0 or 1. For example, the generation device 20a generates single photons using the pulse of a laser, and transmits a photon string made of the single photons to the generation device 20b via the quantum communication channel 101. Then, the generation devices 20a and 20b perform a key distillation operation and generate shared keys from the photon string.

The transmission and reception of a photon string over the quantum communication channel 101 is performed using the BB84 protocol, for example. When the BB84 protocol is used, in case a photo string in the quantum communication channel 101 gets wiretapped, the quantum state of the photons (such as the direction of polarization of the photons) undergoes a change according to the principles of quantum mechanics. That leads to an increase in the quantum bit error rate (QBER) detected at the receiving side. Hence, when the photon string in the quantum communication channel 101 is being wiretapped, because of the abnormality in the quantum bit error rate, the generation devices 20a and 20b can detect that the photon string in the quantum communication channel 101 is being wiretapped. As a result, the generation devices 20a and 20b can generate the shared keys safely from the photon string.

The generation rate for generating cryptographic keys in the quantum key distribution system is dependent on the distance between the base locations A and B as well as dependent on the quality of the optical fiber; and is slow in the range of a few kbps to a few hundred kbps. Moreover, the generation rate for generating cryptographic keys in the quantum key distribution system varies according to the external environment of the optical fiber and according to the disturbance, as well as varies according to the installation environment of the quantum key distribution system. Moreover, when there is an attack suspected to be wiretapping, it is likely that the generation rate for generating cryptographic keys undergoes a drastic decline or comes to a stop.

On another front, it is difficult to predict in advance the communication frequency of an application. On the one hand, sometimes there is continuous transmission of data at a burst and, on the other hand, there are times when no data is transmitted or received for long periods of time.

In this way, on the one hand, the quantum-cryptography communication system uses cryptographic keys that have a slow generation rate and that undergo variation; and, on the other hand, an application performing cryptographic communication also has variation in the volume of data to be subjected to cryptographic communication, thereby making the volume of data unpredictable.

In such a situation, in the case of performing encryption using the OTP or using the AES in which keys are exchanged frequently; if the communication frequency is high, then there is a risk that the cryptographic keys are exhausted and communication cannot be performed at all when needed. In this case, although it is possible to buffer the data, there is an upper limit to the memory capacity regarding the bufferable volume of data.

Conversely, when the communication frequency is low and when almost no cryptographic communication is performed, the cryptographic keys go on getting stored.

Although the cryptographic keys can be stored in a storing unit, there is an upper limit to the memory capacity for storing the keys.

In this way, in the quantum-cryptography communication system, there is a need for configuring a secure communication system to a maximum extent using the finite resources.

Given below is the explanation of the embodiments. In each embodiment, a traffic control mechanism is introduced as a mechanism for controlling the finite resources using varying data. As far as the traffic control mechanism is concerned, a token bucket method is implemented in a first embodiment. Moreover, a leaky bucket method is implemented in a second embodiment. Furthermore, in a third embodiment, a quantum-cryptography communication system in which the token bucket method is implemented is integrated with a communication system of the token bucket method. In a fourth embodiment, a quantum-cryptography communication system in which the leaky bucket method is implemented is integrated with a communication system of the leaky bucket method.

First Embodiment

Firstly, the explanation is given about the first embodiment. The basic concept is as follows.

(A) When the generation rate for generating cryptographic keys remains greater than the arrival rate of the transmitted and received data, the memory unit for storing the cryptographic keys runs short of the memory area. In order to resolve that issue, for example, when the amount of memory for storing the cryptographic keys exceeds a threshold value, control is performed either to destroy (delete) the cryptographic keys generated thereafter or to destroy (delete) the cryptographic keys stored in the past.

(B) On the other hand, when the generation rate for generating cryptographic keys remains smaller than the arrival rate of the transmitted and received data, the memory unit for storing the transmitted and received data runs short of the memory area. In order to resolve that issue, for example, control is performed either to destroy (delete) the transmitted and received data arriving thereafter or to destroy (delete) the transmitted and received data stored in the past.

That is, a generated cryptographic key is treated as a token in the token bucket method, and encryption and decryption of the transmitted and received data is performed only when a token is present. When no token is present, measures such as destroying the transmitted and received data are taken.

Regarding the encryption method using a generated cryptographic key, it is possible to implement the OTP or the AES, for example. However, the implementable encryption method is not limited to those methods. Alternatively, for example, a different encryption method can be implemented in which encryption is performed using the cryptographic keys generated in the quantum key distribution system; each cryptographic key that has been used for a predetermined period of time (or that has been used during the transfer of a predetermined volume of data) is destroyed; and the cryptographic keys are updated.

In the case (B) explained earlier, it is assumed that the transmitted and received data is destroyed. Generally, destroying the transmitted and received data is not a desirable behavior of the communication system. However, depending on the application type, some applications (such as a video transfer application and a voice transfer application) perform operations even after some of the transmitted and received data is destroyed. Moreover, even if the system does not allow destruction of data, in case the transmitted and received data is destroyed, the transmitted and received data that has been destroyed can be restored by retransmitting the destroyed data using a higher-layer communication protocol (such as the transmission control protocol (TCP)). The presence of such a higher-layer communication protocol can be taken into consideration.

Figure 3:
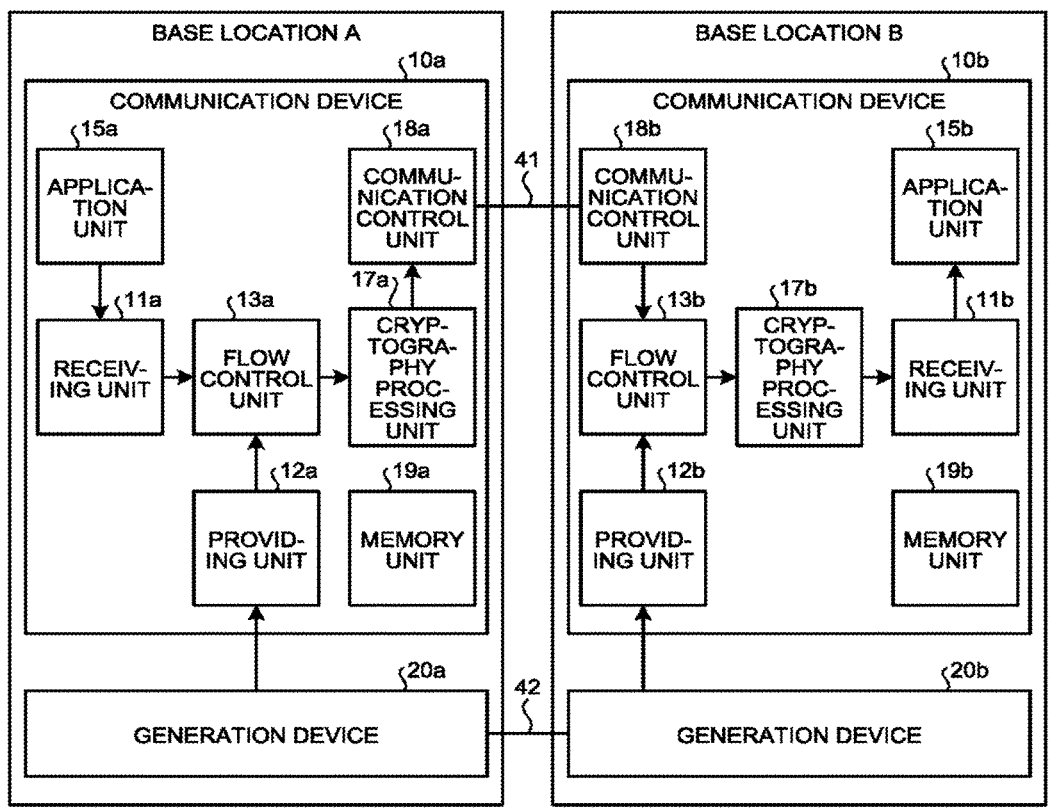
FIG. 3 is a block diagram of communication devices according to a first embodiment.

Given below is the explanation of an exemplary functional configuration of the communication devices 10 according to the first embodiment. FIG. 3 is a block diagram illustrating an exemplary configuration of the communication devices 10a and 10b according to the first embodiment. With reference to FIG. 3, the explanation is given for an example in which the communication device 10a functions as a transmission device that transmits data and the communication device 10b functions as a reception device that receives data. In the case of performing bidirectional communication, the communication devices 10 can be configured to have the transmission function as well as the reception function. In the case in which the communication devices 10 have the transmission function as well as the reception function or in the case in which the functions of the constituent elements as explained below need not be distinguished between the receiving side and the transmitting side, the alphabets "a" and "b" are omitted from the reference numerals.

As illustrated in FIG. 3, the communication device 10a includes an application unit 15a, a receiving unit 11a, a providing unit 12a, a flow control unit 13a, a cryptography processing unit 17a, a communication control unit 18a, and a memory unit 19a.

The memory unit 19a is used to store a variety of data used in various operations performed by the communication device 10a. For example, the memory unit 19a functions as a buffer for temporarily storing the data to be transmitted and the cryptographic keys.

The application unit 15a is an arbitrary application that runs in the communication device 10a. The receiving unit 11a receives, from the application unit 15a, the data to be transmitted.

The providing unit 12a provides the cryptographic keys generated by the quantum key distribution system. The generation devices 20a and 20b are connected via a communication channel 42 and generate cryptographic keys using the quantum key distribution technology. The providing unit 12a receives such cryptographic keys from the generation device 20a and provides them to the flow control unit 13a. Meanwhile, the communication device 10a can alternatively be configured to have the functions of the generation device 20a too.

The flow control unit 13a controls the flow of received data and cryptographic keys according to, for example, the cases (A) and (B) explained earlier. For example, when the data to be subjected to cryptography processing is received, if no cryptographic key has been provided, the flow control unit 13a performs the operation selected from among the following operations with respect to the received data.

(P1) an operation of destroying the data (a first operation)
(P2) an operation of holding the data with an upper limit value as the limit (a second operation)
(P3) an operation of outputting data after attaching thereto information (a mark) indicating that a cryptographic key has not been provided (a third operation)

The cryptography processing unit 17a performs cryptography processing (encryption and decryption) using a cryptographic key with respect to the data output from the flow control unit 13a. For example, the cryptography processing unit 17a provides the function of encrypting data according to the AES or the OTP. Meanwhile, in FIG. 3, the flow control unit and the cryptography processing unit are illustrated as separate constituent elements as a matter of convenience. However, in practice, those constituent elements operate in an integrated manner as described later.

The communication control unit 18a controls the communication with external devices such as the communication device 10b. For example, the communication control unit 18a transmits a cipher text, which has been encrypted by the cryptography processing unit 17a, to the communication device 10b via a communication channel 41.

Given below is the explanation of the communication device 10b functioning as a reception device. The communication device 10b includes an application unit 15b, a receiving unit 11b, a providing unit 12b, a flow control unit 13b, a cryptography processing unit 17b, a communication control unit 18b, and a memory unit 19b.

The memory unit 19b is used to store a variety of data used in various operations performed by the communication device 10b. For example, the memory unit 19b functions as a buffer for temporarily storing the received data and the cryptographic keys.

The communication control unit 18b controls the communication with external devices such as the communication device 10a. For example, the communication control unit 18b receives encrypted data from the communication device 10a.

The providing unit 12b provides the cryptographic keys generated by the quantum key distribution system. For example, the providing unit 12b receives the cryptographic keys, which are generated between the generation devices 20a and 20b, from the generation device 20b and provides them to the flow control unit 13b. Meanwhile, the communication device 10b can alternatively be configured to have the functions of the generation device 20b too.

The flow control unit 13b controls, in an identical manner to the flow control unit 13a, the flow of received data and cryptographic keys according to, for example, the cases (A) and (B) explained earlier.

The cryptography processing unit 17b performs cryptography processing (encryption and decryption) using a cryptographic key with respect to the data output from the flow control unit 13b. For example, the cryptography processing unit 17b provides the function of encrypting data according to the AES or the OTP.

The receiving unit 11b receives the plain text obtained by decryption by the cryptography processing unit 17b, and sends the plain text to the application unit 15b. Herein, the application unit 15b is an arbitrary application running in the communication device 10b.

The providing units 12a and 12b can assign a cryptographic key either as a cryptographic key for encryption during transmission or as a cryptographic key for encryption during reception. The assigned cryptographic key is then provided to the cryptography processing unit at the corresponding base location (i.e., the cryptography processing unit 17a or the cryptography processing unit its).

The application unit 15a is, for example, an application that uses the cryptography processing unit 17a to encrypt data, and performs cryptographic data communication. The application unit 15b is, for example, an application that uses the cryptography processing unit 17b to decrypt the received data. Meanwhile, the application unit 15a can be equipped with the function of receiving data and decrypting it, or can be equipped with the encryption function as well as the decryption function. The same is the case with the application unit 15b.

At each base location, a plurality of applications plurality of application units 15) can be disposed. In that case, instead of providing two types of cryptographic keys, namely, cryptographic keys for encryption during transmission and cryptographic keys for encryption during reception, the providing units 12a and 12b can provide a key assignment function that takes into account the application that would use the cryptographic keys.

A memory unit for holding the data of cryptographic keys can be disposed in between the quantum key distribution system (the generation device 20) and the key assignment function (the providing unit 12), or can be disposed in the key assignment function (the providing unit 12), or can be disposed in between the key assignment function (the providing unit 12) and the cryptography processing function (the cryptography processing unit 17).

Meanwhile, for example, the constituent elements of the communication device 10 (i.e., the application unit, the receiving unit, the flow control unit, the providing unit, the cryptography processing unit, and the communication control unit) can be implemented by making one or more processors such as a central processing unit (CPU) to execute computer programs, that is, can be implemented using software; or can be implemented using hardware such as one or more integrated circuits (IC); or can be implemented using a combination of software and hardware.

The memory unit 19a as well as the memory unit 19b can be configured using any commonly-used memory medium such as a hard disk drive (HDD), an optical disk, or a random access memory (RAM).

Figure 4:
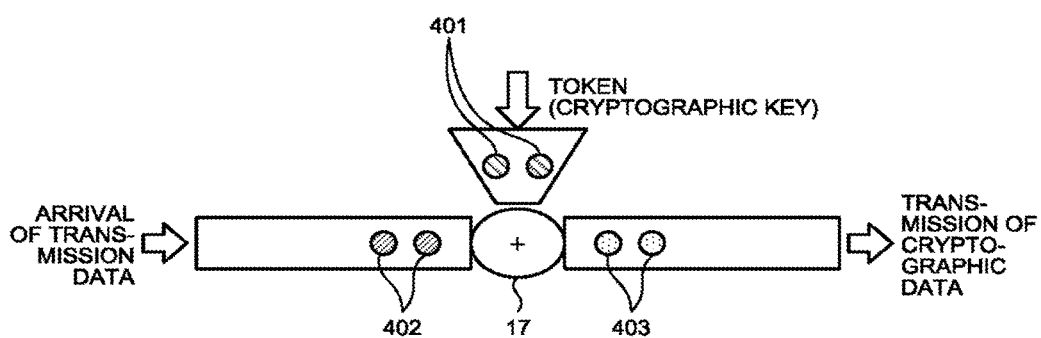
FIG. 4 is a diagram for explaining a control method performed according to the first embodiment.

FIG. 4 is a diagram for explaining a control method performed according to the first embodiment. The cryptography processing unit 17 encrypts transmission data 402, which has arrived, using a cryptographic key 401 and outputs encrypted data (cryptographic data 403).

The cryptography processing unit 17 receives input of the cryptographic key 401 that is generated by the quantum key distribution system. Herein, cryptographic keys are treated as tokens in the token bucket method. The memory unit 19 is used as, for example, a buffer of a finite size for storing cryptographic keys.

The transmission data 402 is input from an application such as the application unit 15. A buffer of a finite size may be disposed for the purpose of storing the transmission data 402. The cryptographic data 403 that is obtained by encrypting the transmission data 402 using the cryptographic key 401 is output. The cryptographic data 403 serves as transmission data that is transmitted from the communication device 10 to an external device.

Meanwhile, in FIG. 4, although an example is illustrated in which the transmission data is encrypted and transmitted, the same control method can be implemented in the case of receiving data and decrypting it. That is, cryptographic data, which is received via an external interface such as the communication control unit 16, and a cryptographic key, which is generated by the quantum key distribution system, are input; and data (plain text data) that is obtained by decrypting the cryptographic data using the cryptographic key is output.

The control of the flow of data and cryptographic keys (tokens) as explained with reference to FIG. 4 is implemented by the flow control unit 13.

Given below is the explanation of the basic rules of the control method performed according to the first embodiment.

(R1-1) Only when a cryptographic key (token) is present, the arrived data is encrypted and then transmitted. That is, the generation rate for generating cryptographic keys is associated with the arrival rate of tokens.

(R1-2) When unit data is encrypted, the token (cryptographic key) used in that encryption is lost. That operation is equivalent to destroying the cryptographic key and updating the keys.

(R1-3) The unit of encryption, the unit cryptographic keys, and the unit of data is set to arbitrary units. That is, the input of cryptographic keys can be considered as a bit stream. In the case of considering the input of cryptographic keys as a bit stream, the OTP becomes the suitable encryption method. In that case, the input data also represents a bit stream. Alternatively, the input of cryptographic keys can be treated as blocks of a particular length. For example, assuming that the input of cryptographic keys is treated as blocks of 128 bits, it is suitable in a system in which AES keys are updated at 128 bits. Herein, the data to be encrypted in a single instance of AES encryption is arbitrary in size. Moreover, the number of times of AES encryption after which the keys are to be updated is also arbitrary. In the case of treating the input of cryptographic keys as blocks, the size is not limited to 128 bits but can be 256 bits or can be still greater such as one megabit. In that case, inside the cryptography processing unit 17*a*, control is so performed that a cryptographic key of an appropriate size is clipped from the input block of the input cryptographic key, and data encryption is performed using the clipped cryptographic key. When data encryption is performed for a specified number of times, control is so performed that the next cryptographic key is clipped from the input block, the keys are exchanged, and the next set of data is encrypted.

(R1-4) The maximum storable volume of cryptographic keys (i.e., the bucket size) is fixed. When cryptographic keys equal to or greater than the maximum storable volume are present, some of the cryptographic keys are destroyed. At the time of destroying cryptographic keys, synchronization needs to be achieved among a plurality of communication devices 10 that are performing communication, and the same cryptographic keys need to be destroyed. For that reason, a plurality of communication devices 10 performs control communication for the purpose of identifying the cryptographic keys to be destroyed.

(R1-5) When cryptographic keys are not present, the behavior in response to the arrival of data can have various options based on the token bucket method.

In the case in which the cryptographic keys are not present, given below are three examples of the optional behavior in response to the arrival of data. These examples are equivalent to the options "drop", "shaped", and "marked" in the token bucket method.

Firstly, the explanation is given about the method equivalent to "drop". In this method, the data that arrives in the absence of any cryptographic key is immediately destroyed. As described earlier, it can be assumed that retransmission is performed by the higher-layer communication protocol.

Given below is the explanation about the method equivalent to "shaped". In this method, the sets of data that arrive in the absence of any cryptographic key are stored for a maximum of N number of sets of data (where N is an integer equal to or greater than one as set in advance). As soon as a cryptographic key is generated, the stored data is processed (i.e., encrypted and transmitted). Herein, since not more than N number of sets of data can be stored, in the state in which the N number of sets of data are stored, the data that arrives newly is destroyed.

Lastly, the explanation is given about the method equivalent to "marked". In this method, the data that arrives in the absence of any cryptographic key is transmitted after being attached with information (a mark) indicating that no token is present. As far as treating the data attached with such a mark is concerned, it is possible to think of two methods.

In the first method, the cryptography processing unit 17 encrypts the data using the previously-used cryptographic keys without modification. In this method, it is necessary to pay attention to the fact that, if the same cryptographic keys are repeatedly used for a number of times, there is a risk of a decline in the strength of the communication security. In the second method, the cryptography processing unit 17 does not perform encryption and transmits the data in the form of plain text. Since encryption is not performed, it is necessary to pay attention to the fact that the security is not guaranteed.

Regarding the variations in the first embodiment, such as the unit of encryption, the unit of cryptographic keys, the unit of data, and the optional behavior in response to the arrival of data in the absence of any cryptographic key; which variation is to be implemented is decided in advance among a plurality of communication devices 10. Moreover, the variation to be implemented can be changed according to the situation. In that case, a plurality of communication devices 10 needs to exchange control messages indicating the method to be implemented next. Furthermore, when a plurality of channels and a plurality of applications are operating among a plurality of communication devices 10, settings can be done to implement a different variation with respect to each channel and each application.

Figure 5:
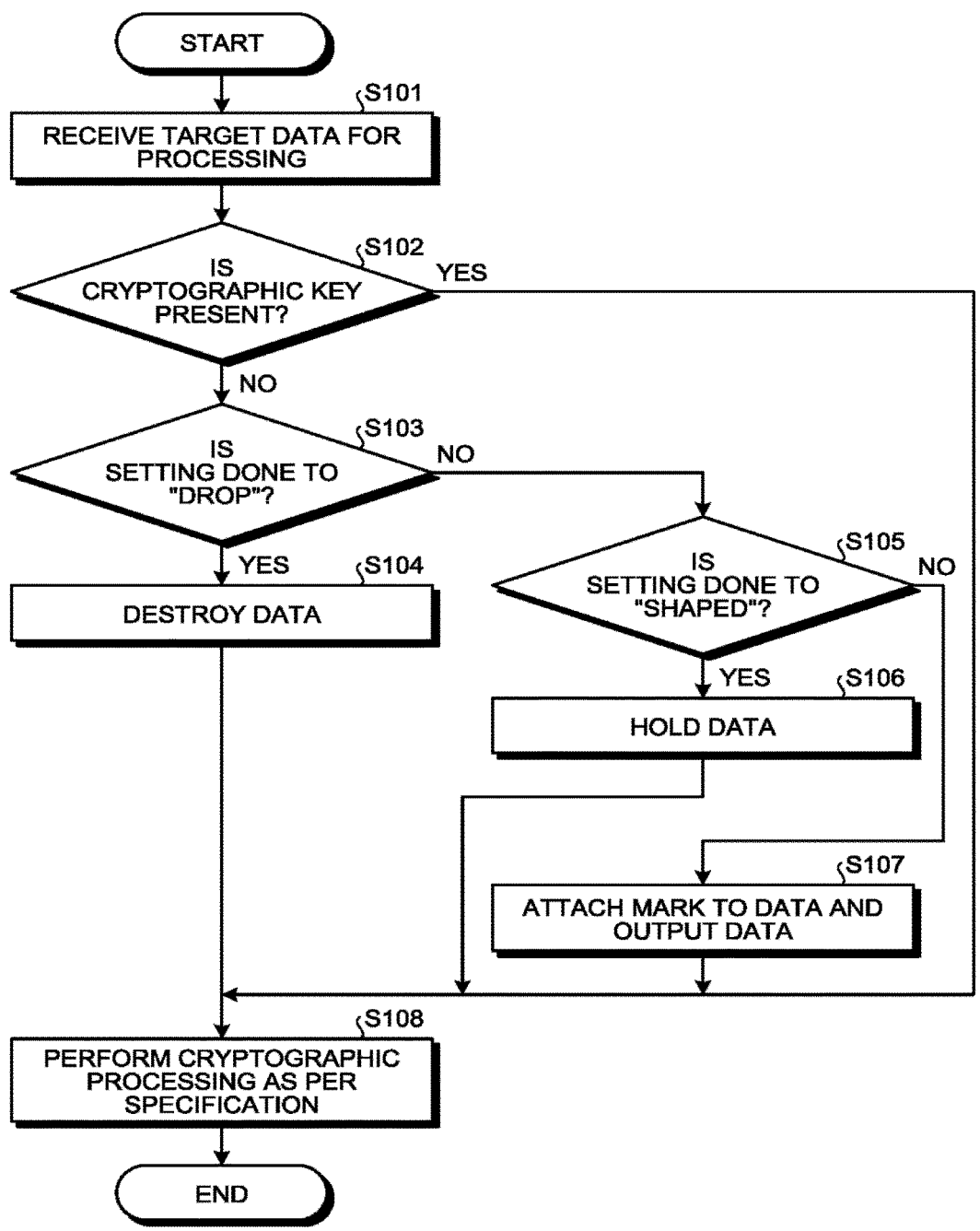
FIG. 5 is a flowchart for explaining cryptography processing performed according to the first embodiment.

Explained below with reference to FIG. 5 is the cryptography processing performed by the communication device 10 configured in the abovementioned manner according to the first embodiment. FIG. 5 is a flowchart for explaining an example of the cryptography processing performed according to the first embodiment.

The receiving unit 11 receives the target data for processing (Step S101). The flow control unit 13*a* determines whether or not a cryptographic key to be used for the received data is present (Step S102). Herein, the cryptographic key either can be a cryptographic key to be used in data encryption or can be a cryptographic key to be used in data decryption.

If no cryptographic key is present (No at Step S102), then the flow control unit 13*a* determines whether or not "drop" is set as the option in response to the arrival of data in the absence of any cryptographic key (Step S103). Herein, it is assumed that either one of "drop", "shaped" and "marked" is set.

If "drop" is set as the option (Yes at Step 03), the flow control unit 13*a* destroys the received data (Step 104). However, if "drop" is not set as the option (No at Step S103), the flow control unit 13*a* determines whether or not "shaped" is set as the option (Step S105). If "shaped" is set as the option (Yes at Step S105), the flow control unit 13*a* holds the received data in a buffer such as the memory unit 19 (Step S106). However, if "shaped" is not set as the option, that is, when "marked" is set as the option (No at Step S105), then the flow control unit 13*a* attaches a mark to the received data and then outputs the data (Step S107).

Meanwhile, if it is determined at Step S102 that a cryptographic key is present (Yes at Step S102), or after Step S104, or after Step S106, or after Step S107; the cryptography processing unit 17 performs cryptography processing with respect to the data as per the specification (Step S108).

For example, when a cryptographic key is present, the cryptography processing unit 17 performs cryptography processing with respect to data using that cryptographic key. Meanwhile, when the data is destroyed (Step 104); the cryptography processing unit 17 need not perform cryptography processing. When the data is held in a buffer (Step S106), the cryptography processing unit 17 performs cryptography processing with respect to the data as soon as a cryptographic key is provided. When the data has a mark attached thereto, the cryptography processing unit 17 performs cryptography processing with respect to the data using the previously-used cryptographic keys, for example. If a method of not performing encryption is specified, the cryptography processing unit 17 can output the data without performing cryptography processing with respect to the data.

In this way, in the communication device according to the first embodiment, as a result of implementing the token bucket method in which cryptographic keys are treated as tokens, it becomes possible to achieve a secure system to a maximum extent using the finite resources.

Second Embodiment

Figure 6:
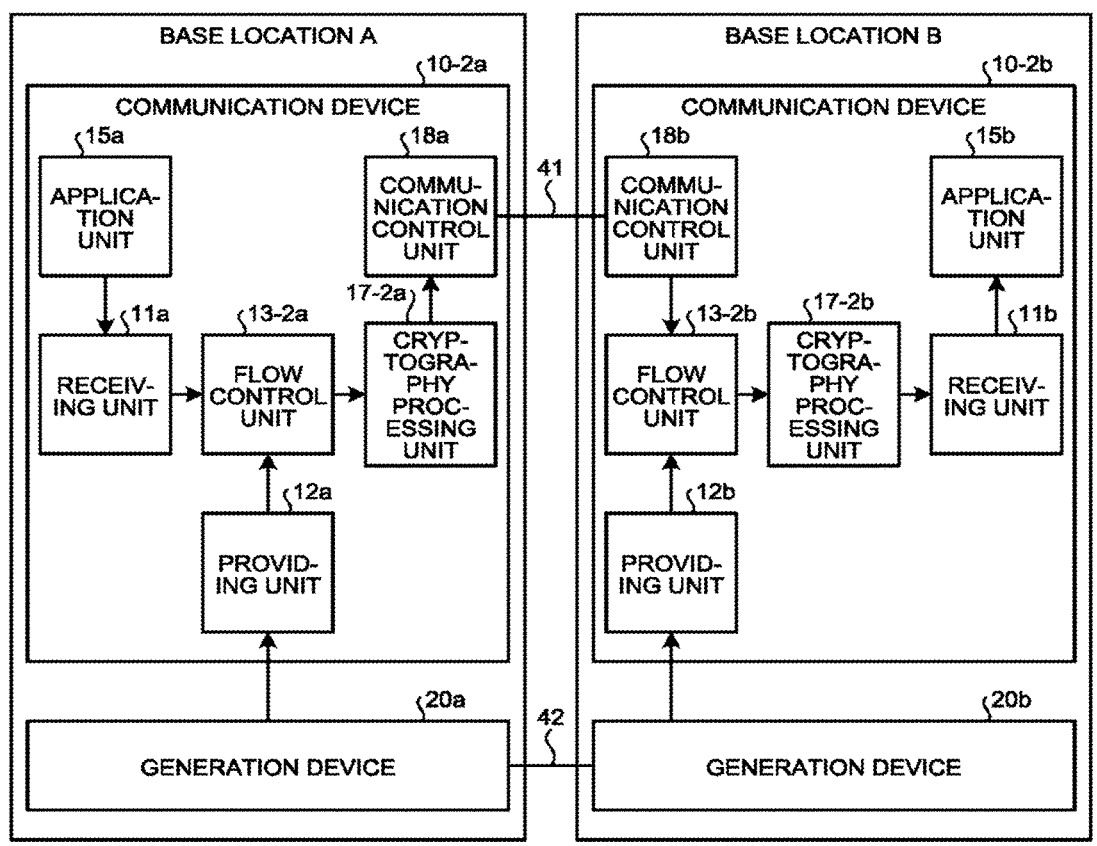
FIG. 6 is a block diagram of communication devices according to a second embodiment.

In the second embodiment, the explanation is given for an example in which the leaky bucket method is implemented. FIG. 6 is a block diagram illustrating an exemplary configuration of communication devices 10-2a and 10-2b according to the second embodiment. In FIG. 6 is illustrated an example in which the communication device 10-2a functions as a transmission device that transmits data and the communication device 10-2b functions as a reception device that receives data. Alternatively, as described above, the communication devices 10-2 can be configured to have the transmission function as well as the reception function. The following explanation is given without distinguishing between the transmitting side and the receiving side.

As illustrated in FIG. 6, the communication device 10-2 includes the application unit 15, the receiving unit 11, the providing unit 12, a flow control unit 13-2 (13-2a, 13-2b), a cryptography processing unit 17-2 (17-2a, 17-2b), and the communication control unit 18.

In the second embodiment, the functions of the flow control unit 13-2 and the cryptography processing unit 17-2 differ from the corresponding functions according to the first embodiment. Moreover, in the second embodiment, the memory unit 19 is omitted. Apart from that, the configuration and the functions are identical to those illustrated in FIG. 3 that represents the block diagram of the communication device 10 according to the first embodiment. Hence, the same reference numerals are used, and the same explanation is not repeated.

The flow control unit controls the flow of received data and cryptographic keys. When the data to be subjected to cryptography processing is received; if a cryptographic key has not been provided, then the flow control unit 13-2 performs identical operations to the operations (P1) to (P3) explained in the first embodiment. When a cryptographic key is provided; if the data to be subjected to cryptography processing has not been received, then the flow control unit 13-2 further performs the operation selected from among the following operations with respect to the provided cryptographic key.

(P4) an operation of destroying the provided cryptographic key (a fourth operation)
(P5) an operation of holding cryptographic keys with an upper limit value as the limit fifth operation)
(P6) an operation of outputting a cryptographic key after attaching thereto information (a mark) indicating that the data is not received (a sixth operation)

In an identical manner to the cryptography processing unit 17 according to the first embodiment, the cryptography processing unit 17-2 performs cryptography processing (encryption and decryption) with respect to the data, which is output from the flow control unit 13-2, using a cryptographic key. Moreover, the cryptography processing unit 17-2 according to the second embodiment performs processing according to the operation selected from among the operations (P4) to (P6) (details are given later).

Figure 7:
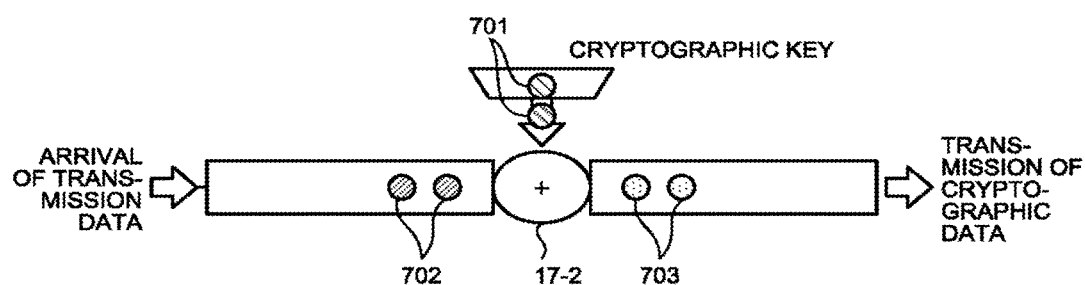
FIG. 7 is a diagram for explaining a control method performed according to the second embodiment.

FIG. 7 is a diagram for explaining a control method performed according to the second embodiment. In the second embodiment, the control method of the quantum-cryptography communication system is implemented based on the leaky bucket method.

Firstly, the explanation is given about the common differences between the token bucket method and the leaky bucket method. The token bucket method is a traffic shaping method for limiting the average data transfer rate. In the token bucket method, burst transfer is allowed up to the bucket size (for example, the data size that can be transmitted using "N number" of cryptographic keys). However, on a long-term basis, the data communication speed is rate-limited to the arrival speed of tokens. In contrast, the leaky bucket method is a method for limiting the data transfer rate. In the leaky bucket method, the burst characteristics of data transfer are leveled, and burst transfer is not allowed.

The control method performed according to the second embodiment is explained below with reference to FIG. 7. The cryptography processing unit 17-2 encrypts transmission data 702, which has arrived, using a cryptographic key 701 and outputs encrypted data (cryptographic data 703).

The cryptography processing unit 17-2 receives input of the cryptographic key 701 that is generated by the quantum key distribution system. Herein, it can be interpreted that the cryptographic key 701 leaks out of the leaky bucket according to the generation rate, and is input to the cryptography processing unit 17-2. In order to store the leaked cryptographic key 701, a buffer of a finite size may be disposed (depending on the option (described later)).

Moreover, the cryptography processing unit 17-2 receives input of the transmission data 702 that is generated by an application such as the application unit 15. A buffer of a finite size may be disposed to store the transmission data 702. The cryptographic data 703 that is obtained by encrypting the transmission data 702 using the cryptographic key 701 is output. The cryptographic data 703 serves as transmission data that is transmitted from the communication device 10-2 to an external device.

Meanwhile, in FIG. 7, although the example is illustrated in which the transmission data is encrypted and transmitted, the same control method can be implemented in the case of receiving data and decrypting it. That is, cryptographic data, which is received via an external interface such as the communication control unit 18, and a cryptographic key, which is generated by the quantum key distribution system, are input; and data (plain text data) obtained by decrypting the cryptographic data using the cryptographic key is output.

The control of the flow of data and cryptographic keys as explained with reference to FIG. 7 is implemented by the flow control unit 13-2.

Given below is the explanation of the basic rules of the control method performed according to the second embodiment.

(R2-1) Only when a cryptographic key is present, the arrived data is encrypted and then transmitted. That is, the generation rate for generating cryptographic keys is associated with the rate of leakage of cryptographic keys from the bucket.

(R2-2) When unit data is encrypted, the cryptographic key used in that encryption is lost. That operation is equivalent to destroying the cryptographic key and updating the keys.

(R2-3) The unit of encryption, the unit of cryptographic keys, and the unit of data is set to arbitrary units.

(R2-4) When cryptographic keys are not present, the behavior in response to the arrival of data can have various options such as "drop", "shaped", and "marked" in an identical manner to the first embodiment.

(R2-5) When the data has not arrived, the behavior in response to the leakage of a cryptographic key (the generation of a cryptographic key) can have various options by applying the same concept as in the token bucket method.

In the case in which the data has not arrived, given below are three examples of the optional behavior in response to the generation of a cryptographic key. These examples are equivalent to the options "drop", "shaped", and "marked" in the token bucket method.

Firstly, the explanation is given about the method equivalent to "drop". In this method, the cryptographic key that is generated when the data has not arrived is immediately destroyed. This method is equivalent to the method in which a buffer for storing cryptographic keys is not available.

Given below is the explanation about the method equivalent to "shaped". In this method, the cryptographic keys that are generated when the data has not arrived are stored for a maximum of N number of cryptographic keys. As soon as data arrives, the stored data is processed (i.e., encrypted and transmitted). Herein, since not more than N number of cryptographic keys can be stored, in the state in which the N number of cryptographic keys is stored, any cryptographic key that arrives newly is destroyed. This method corresponds to the token bucket method (the first embodiment). In this method, in an identical manner to the first embodiment, the communication device 10-2 needs to include a buffer such as the memory unit 19 for storing the cryptographic keys.

Lastly, the explanation is given about the method equivalent to "marked". In this method, the cryptographic keys that are generated when the data has not arrived are output after being attached with information (a mark) indicating that the data has not arrived. As far as treating the cryptographic keys attached with such a mark is concerned, it is possible to think of two methods.

In the first method, since there is no data that is be encrypted, the cryptography processing unit 17-2 instead generates dummy data, encrypts the dummy data using a cryptographic key, and transmits the dummy data. Regarding the data to be used as dummy data, it is necessary to enter an agreement in advance with the node serving as the communication partner. Examples of the dummy data include data having all 0s, and data having all 1s. Herein, it is desirable that information indicating whether or not the data is dummy data is included in the transmission packets so as to enable the receiving side to detect the dummy data.

In the second method, a new cryptographic key is generated based on the cryptographic key that has been provided. For example, the cryptography processing unit 17-2 performs an XOR operation of the existing cryptographic key and the newly-generated cryptographic key, and replaces the cryptographic key.

Figure 8:
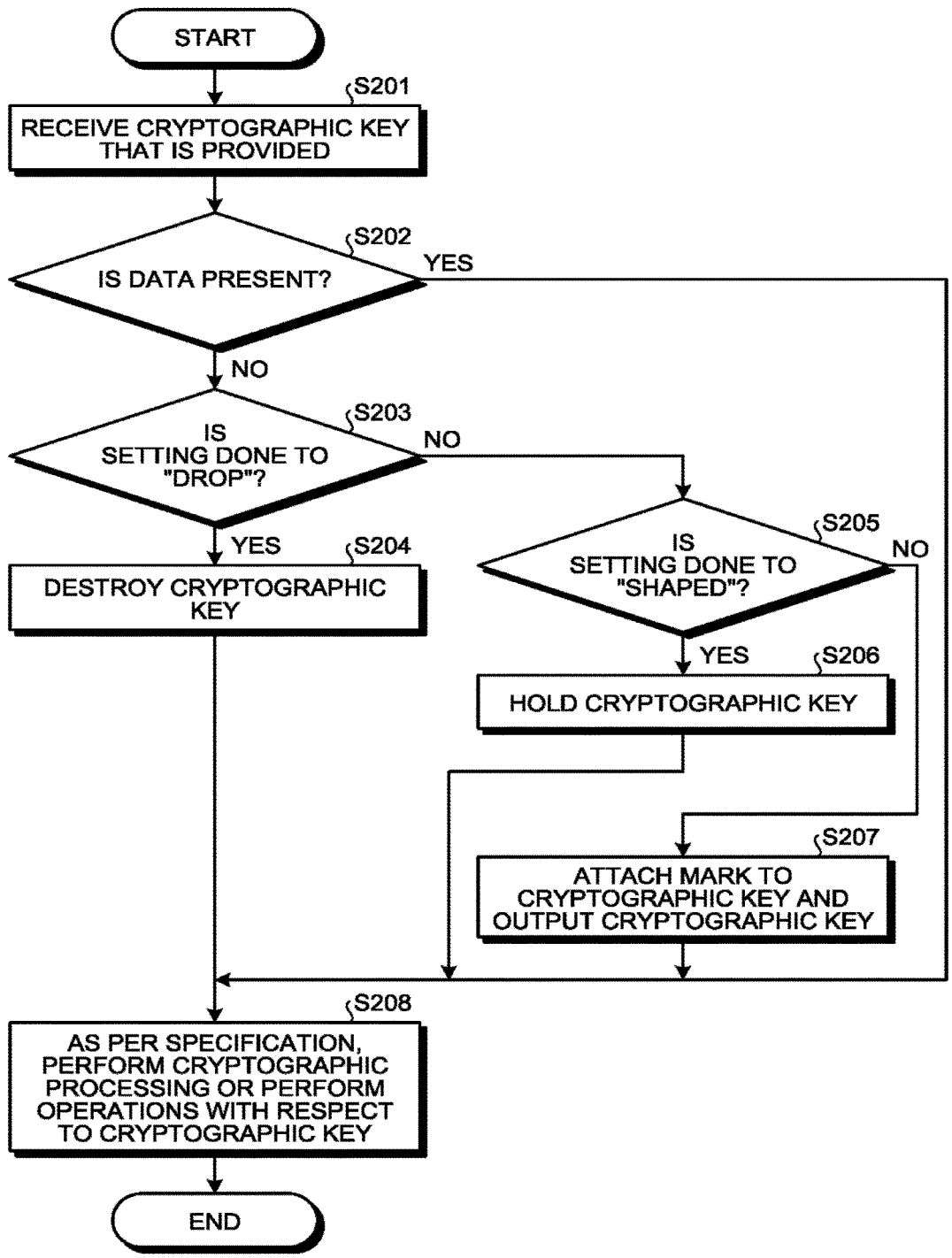
FIG. 8 is a flowchart for explaining an example of cryptography processing performed according to the second embodiment.

Explained below with reference to FIG. 8 is the cryptography processing performed by the communication device 10-2 configured in the abovementioned manner according to the second embodiment. FIG. 8 is a flowchart for explaining an example of the cryptography processing performed according to the second embodiment. The cryptography processing illustrated in FIG. 8 is performed when a cryptographic key is provided. The operations performed when the target data for processing is received are identical to the operations explained with reference to FIG. 5 according to the first embodiment. Hence, that explanation is not repeated.

The flow control unit 13-2 receives the cryptographic key that has been provided (Step S201). Then, the flow control unit 13-2 determines whether or not the data with respect to which the cryptographic key is to be used is present (Step S202).

If the data is not present (No at Step S202), then the flow control unit 13-2 determines whether or not "drop" is set as the option in response to the generation of a cryptographic key in the absence of data (Step S203). Herein, it is assumed that either one of "drop", "shaped" and "marked" is set.

If "drop" is set as the option (Yes at Step S203), then the flow control unit 13-2 destroys the cryptographic key that has been provided (Step S204). However, if "drop" is not set as the option (No at Step S203), the flow control unit 13*a* determines whether or not "shaped" is set as the option (Step S205). If "shaped" is set as the option (Yes at Step S205), the flow control unit 13-2 holds the provided cryptographic key in a buffer (such as the memory unit 19) (Step S206). However, if "shaped" is not set as the option, that is, when "marked" is set as the option (No at Step S205), the flow control unit 13-2 attaches a mark to the received cryptographic key and then outputs it (Step S207).

Meanwhile, if it is determined at Step S202 that data is present (Yes at Step S202), or after Step S204, or after Step S206, or after Step S207; the cryptography processing unit 17-2 either performs cryptography processing with respect to the data or performs operations with respect to the cryptographic key as per the specification (Step 208).

For example, when data is present, the cryptography processing unit 17-2 performs cryptography processing with respect to that data using the provided cryptographic key. Meanwhile, when the cryptographic key is destroyed (Step S204), the cryptography processing unit 17-2 need not perform cryptography processing. When the cryptographic key is held in a buffer (Step S206); as soon as data is provided, the cryptography processing unit 17-2 performs cryptography processing using the cryptographic key that has been held. When a mark is attached to the cryptographic key; for example, the cryptography processing unit 17-2 generates dummy data, encrypts the dummy data using the cryptographic key, and then transmits the dummy data. When the method for generating a new cryptographic key is specified, the cryptography processing unit 17-2 can generate a new cryptographic key using the cryptographic key that has been provided.

In this way, in the communication device according to the second embodiment, as a result of implementing the leaky bucket method, it becomes possible to achieve a secure system to a maximum extent using the finite resources.

Third Embodiment

In the third embodiment, traffic control of data using the token bucket method is combined with the method explained in the first embodiment.

Figure 9:
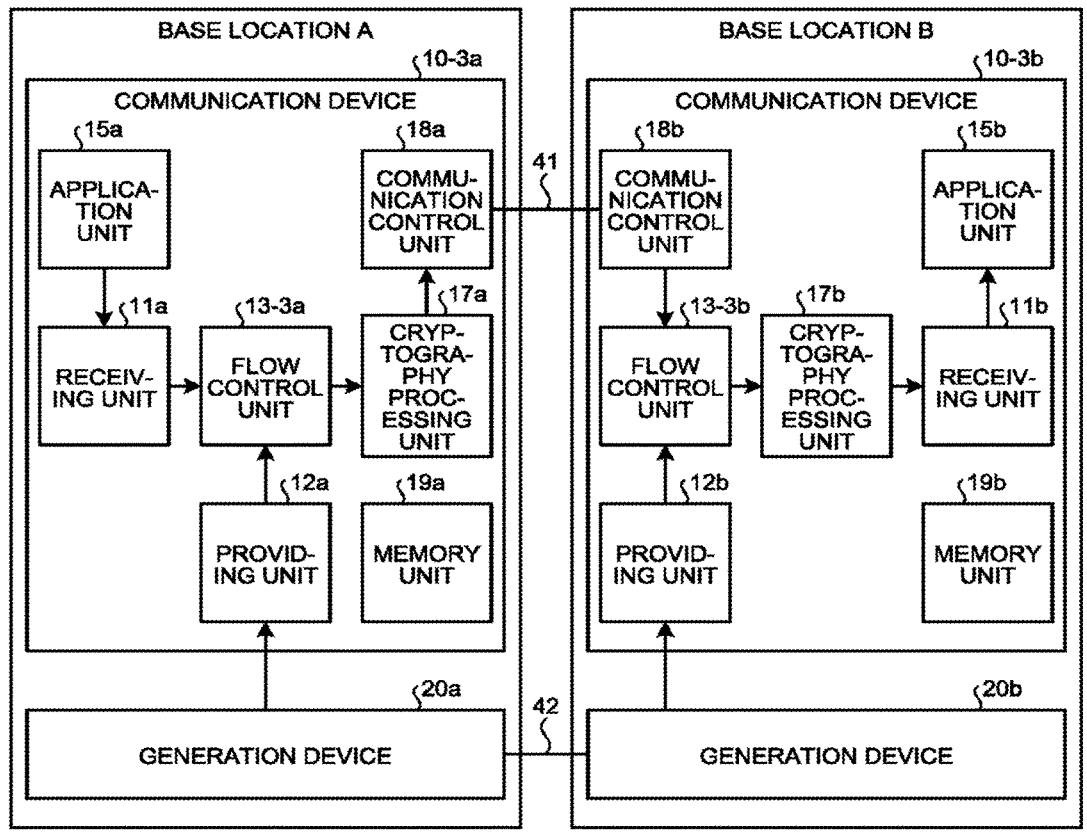
FIG. 9 is a block diagram of communication devices according to a third embodiment.

FIG. 9 is a block diagram illustrating an exemplary configuration of communication devices 10-3a and 10-3b according to the third embodiment. In FIG. 9 is illustrated an example in which the communication device 10-3a functions as a transmission device that transmits data and the communication device 10-3b functions as a reception device that receives data. Alternatively, as described above, the communication devices 10-3 can be configured to have the transmission function as well as the reception function. The following explanation is given without distinguishing between the transmitting side and the receiving side.

As illustrated in FIG. 9, the communication device 10-3 includes the application unit 13, the receiving unit 11, the providing unit 12, a flow control unit 13-3 (13-3a, 13-3b), the cryptography processing unit 17, the communication control unit 10, and the memory unit 19.

In the third embodiment, the functions of the flow control unit 13-3 are different as compared to the first embodiment. Apart from that, the configuration and the functions are identical to those illustrated in FIG. 3 that represents the block diagram of the communication device 10 according to the first embodiment. Hence, the same reference numerals are used, and the same explanation is not repeated.

The flow control unit 13-3 controls the flow of received data and cryptographic keys. As compared to the flow control unit 13 according to the first embodiment, the flow control unit 13-3 according to the third embodiment differs in the way of performing traffic control based on the token bucket method also with respect to the arrived data.

Figure 10:
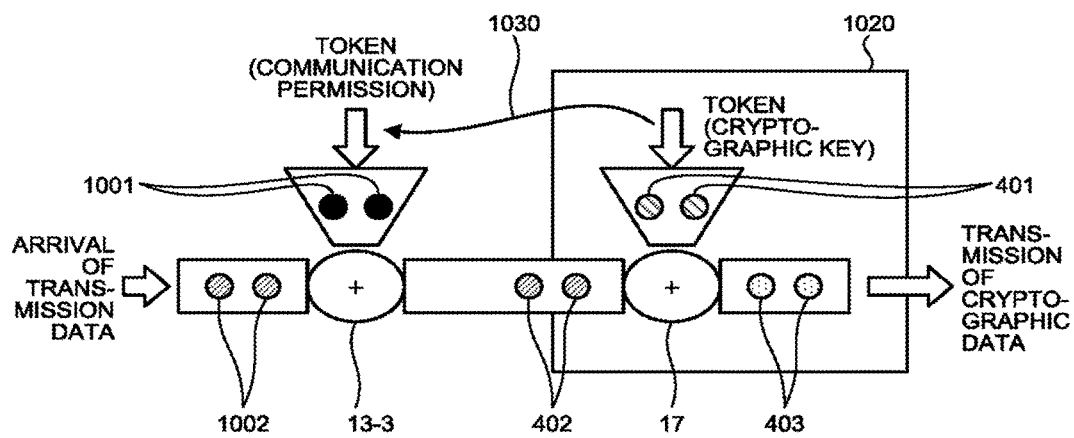
FIG. 10 is a diagram for explaining a control method performed according to the third embodiment.

FIG. 10 is a diagram for explaining a control method performed according to the third embodiment. In the third embodiment, at the point of time of arrival of data (for example, when the receiving unit 11a receives data or when the communication control unit 18b receives data), traffic control of data based on the token bucket method is performed.

That is, on arrival of data 1002, firstly, traffic control based on the token bucket method is performed and, if a token 1001 (a token for communication permission) is present, the data 1002 passes through.

Subsequently, the transmission data 402 that has passed through gets encrypted using a cryptographic key according to the method explained in the first embodiment. Eventually, the encrypted data (the cryptographic data 403) is transmitted. A flow control 1020 indicates that the method identical to the method according to the first embodiment is implemented.

Meanwhile, during the traffic control (the token bucket method) with respect to data too, in an identical manner to the first embodiment, the amount of tokens (the token 1001) can be controlled according to the generation rate for generating cryptographic keys (an arrow 1030). As a result, the traffic control with respect to data can be implemented in cooperation with the traffic control in which the cryptographic keys are treated as tokens as explained in the first embodiment.

Meanwhile, in FIG. 10 is illustrated an example in which, on arrival of data, firstly, traffic control with respect to the data is performed; and then the traffic control in which the cryptographic keys are treated as tokens as explained in the first embodiment is performed. Conversely, the configuration can be such that, on arrival of data, firstly, the traffic control in which the cryptographic keys are treated as tokens as explained in the first embodiment is performed; and then the traffic control with respect to the encrypted data is performed. Still alternatively, the configuration can be such that, using the token corresponding to the generation rate for generating cryptographic keys, the traffic control with respect to only the arrived data is performed.

Fourth Embodiment

In the fourth embodiment, traffic control of data using the leaky bucket method is combined with the method explained in the second embodiment.

Figure 11:
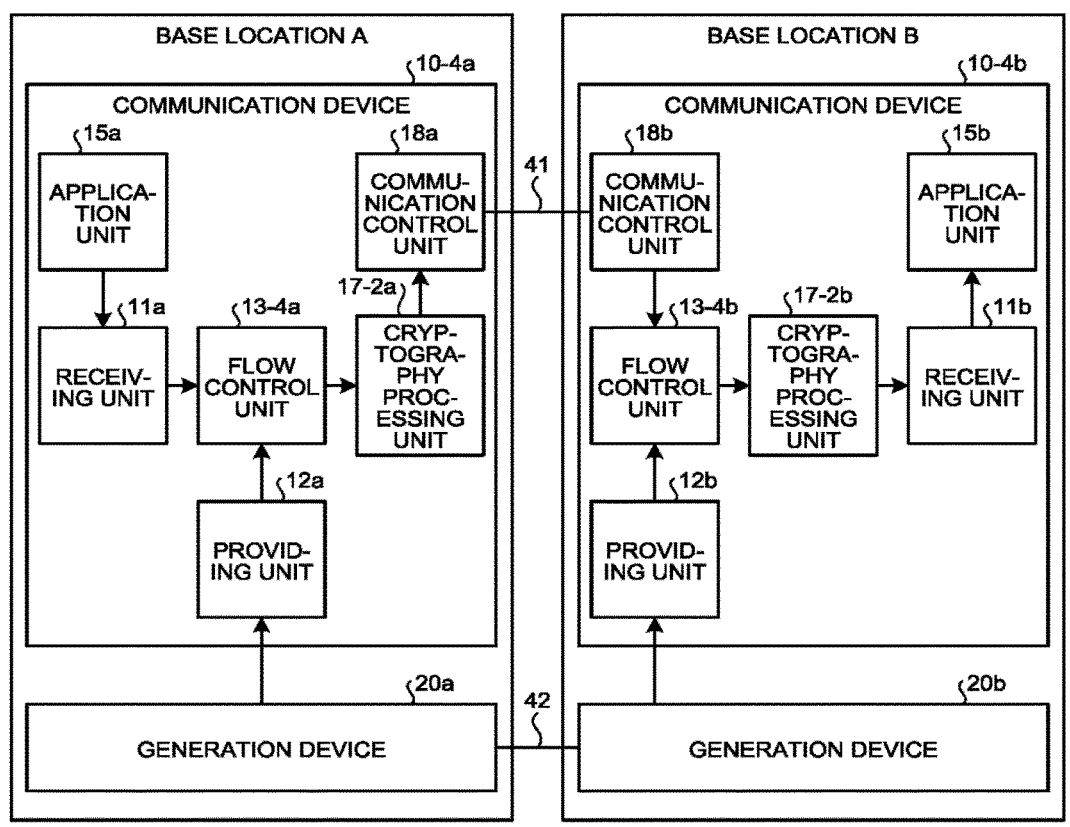
FIG. 11 is a block diagram of communication devices according to a fourth embodiment.

FIG. 11 is a block diagram illustrating an exemplary configuration of communication devices 10-4a and 10-1b according to the fourth embodiment. In FIG. 11 is illustrated an example in which the communication device 10-4a functions as a transmission device that transmits data and the communication device 10-4b functions as a reception device that receives data. Alternatively, as described above, the communication devices 10-4 can be configured to have the transmission function as well as the reception function. The following explanation is given without distinguishing between the transmitting side and the receiving side.

As illustrated in FIG. 11, the communication device 10-4 includes the application unit 15, the receiving unit 11, the providing unit 12, a flow control unit 13-4 (13-4a, 13-4b), the cryptography processing unit 17-2, and the communication control unit 16.

In the fourth embodiment, the functions of the flow control unit 13-4 are different as compared to the second embodiment. Apart from that, the configuration and the functions are identical to those illustrated in FIG. 6 that represents the block diagram of the communication device 10-2 according to the second embodiment. Hence, the same reference numerals are used, and the same explanation is not repeated.

The flow control unit 13-4 controls the flow of received data and cryptographic keys. As compared to the flow control unit 13-2 according to the second embodiment, the flow control unit 13-4 according to the fourth embodiment differs in the way of performing traffic control based on the leaky bucket method also with resect to the arrived data.

Figure 12:
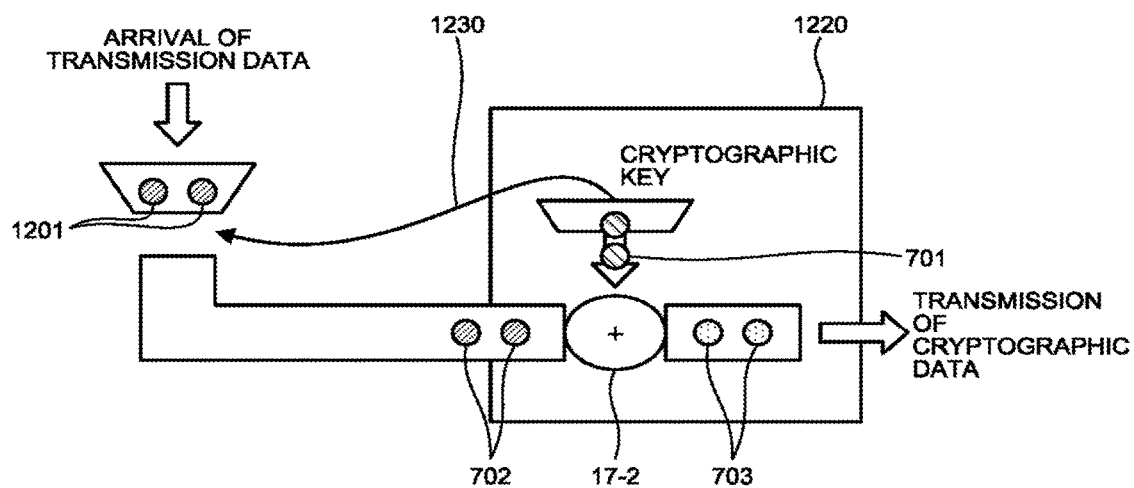
FIG. 12 is a diagram for explaining a control method performed according to the fourth embodiment.

FIG. 12 is a diagram for explaining a control method performed according to the fourth embodiment. In the fourth embodiment, at the point of time of arrival of data (for example, when the receiving unit 11a receives data or when the communication control unit 18b receives data), traffic control of data based on the leaky bucket method is performed.

That is, on arrival of data 1201, firstly, traffic control based on the leaky bucket method is performed.

Subsequently, the transmission data 702 that has leaked from the leaky bucket is encrypted using a cryptographic key according to the method explained in the second embodiment. Eventually, the encrypted data (the cryptographic data 703) is transmitted. A flow control 1220 indicates that the method identical to the method according to the second embodiment is implemented.

Meanwhile, during the traffic control (the leaky bucket method) with respect to data, the amount of data that leaks out can be controlled according to the generation rate for generating cryptographic keys (an arrow 1230). As a result, the traffic control with respect to data can be implemented in cooperation with the traffic control as explained in the second embodiment.

Meanwhile, in FIG. 12 is illustrated an example in which, on arrival of data, firstly, traffic control with respect to the data is performed; and then the traffic control identical to that in the second embodiment is performed. Conversely, the configuration can be such that, on arrival of data, firstly, the traffic control identical to that in the second embodiment is performed; and then the traffic control (the leaky bucket method) with respect to the encrypted data is performed. Still alternatively, the configuration can be such that, using the token corresponding to the generation rate for generating cryptographic keys, the traffic control (the leaky bucket method) with respect to only the arrived data is performed.

Modification Example

In the third embodiment, instead of performing traffic control based on the token bucket method with respect to the arrived data, traffic control based on the leaky bucket method can be performed with respect to the arrived data in an identical manner to the fourth embodiment. That is, traffic control based on the leaky bucket method with respect to the data can be combined with traffic control in which cryptographic keys are treated as tokens in an identical manner to the first embodiment.

In an identical manner, in the fourth embodiment, instead of performing traffic control based on the leaky bucket method with respect to the arrived data, traffic control based on the token bucket method can be performed with respect to the arrived data in an identical manner to the third embodiment. That is, traffic control based on the token bucket method with respect to the data can be combined with traffic control identical to that performed in the second embodiment.

As described above, according to the first to fourth embodiments, it becomes possible to achieve a secure communication system to a maximum extent using the finite resources.

Figure 13:
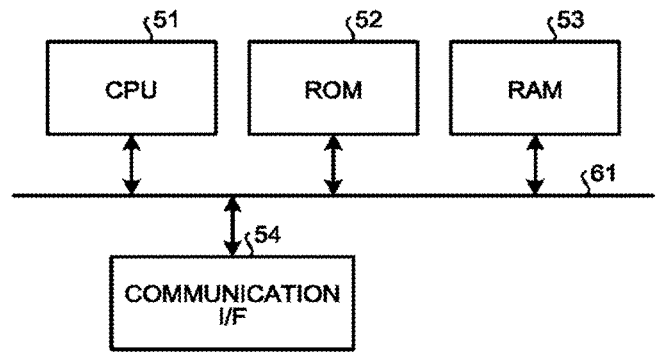
FIG. 13 is a hardware configuration diagram of the communication device according to the embodiments.

Explained below with reference to FIG. 13 is a hardware configuration of the communication device according to the first to fourth embodiments. FIG. 13 is an explanatory diagram illustrating an exemplary hardware configuration of the communication device according to the first to fourth embodiments.

The communication device according to the first to fourth embodiments includes a control device such as a central processing unit (CPU) 51, memory devices such as a read only memory (ROM) 52 or a random access memory 53, a communication I/F 54 that establishes connection with a network and performs communication, and a bus 61 that connects the constituent elements with each other.

A computer program executed in the communication device according to the first to fourth embodiments is stored in advance in the ROM 52.

Alternatively, the computer program executed in the communication device according to the first to fourth embodiments can be recorded as an installable file or an executable file in a computer-readable recording medium such as a compact disk read only memory (CD-ROM), a flexible disk (FD), a compact disk recordable (CD-R), or a digital versatile disk (DVD); and can be provided as a computer program product.

Still alternatively, the computer program executed in the communication device according to the first to fourth embodiments can be stored in a downloadable manner in a computer connected to a network such as the Internet. Still alternatively, the computer program executed in the communication device according to the first to fourth embodiments can be distributed over a network such as the Internet.

The computer program executed in the communication device according to the first to fourth embodiments can make a computer function as the constituent elements of the communication device. In that computer, the CPU can read the computer program from a computer-readable memory medium into a main memory device, and execute the computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication device comprising:
one or more hardware processors configured to:
provide a cryptographic key generated using a quantum key distribution technology;
perform a traffic control with respect to data for cryptography processing, the traffic control controlling permission for communication of the data, the traffic control being a first traffic control based on a token bucket method in which a token is used that corresponds to a generation rate for generating the cryptographic key using the quantum key distribution technology or a second traffic control based on a leaky bucket method in which a leakage amount is adjusted according to the generation rate for generating the cryptographic key using the quantum key distribution technology;
perform a flow control that includes a first flow control and a second flow control,
the flow control being performed with respect to the data, the communication of which is permitted;
the first flow control performing, if the cryptographic key has not been provided at time of reception of the data with which the traffic control is performed, with respect to the received data, an operation selected from among:
a first operation of destroying the data,
a second operation of holding the data, and
a third operation of attaching, to the data, information indicating that the cryptographic key has not been provided, and then outputting the data,
the second flow control outputting the received data if the cryptographic key is provided at time of the reception of the data with which the traffic control is performed; and
perform with respect to data with which the flow control is performed, the cryptography processing using the cryptographic key.

2. The communication device according to claim 1, further comprising a memory that is used to store a cryptographic key provided from the hardware processors, wherein when an amount of memory for storing the cryptographic key in the memory exceeds a threshold value, the hardware processors destroy some of cryptographic keys stored in the memory.

3. The communication device according to claim 1, wherein, when the third operation is selected, the hardware processors:

use a cryptographic key used in past and perform the cryptography processing with respect to the data with which the flow control is performed, or output the data with which the flow control is performed without performing the cryptography processing with respect to the data.

4. The communication device according to claim 1, wherein, if the data for cryptography processing has not been received when the cryptographic key is provided, the hardware processors perform, with respect to the provided cryptographic key, an operation selected from among:
   a fourth operation of destroying the provided cryptographic key,
   a fifth operation of holding the cryptographic key, and
   a sixth operation of attaching, to the provided cryptographic key, information indicating that the data has not been received, and then outputting the cryptographic key.

5. The communication device according to claim 4, wherein, when the sixth operation is selected, the hardware processors:
   perform the cryptography processing with respect to dummy data, or
   generate a new cryptographic key based on the provided cryptographic key.

6. A communication method comprising:
   providing a cryptographic key generated using quantum key distribution technology;
   performing a traffic control with respect to data for cryptography procession, the traffic control controlling permission for communication of the data, the traffic control being a first traffic control based on a token bucket method in which a token is used that corresponds to a generation rate for generating the cryptographic key using the quantum key distribution technology or a second traffic control based on a leaky bucket method in which a leakage amount is adjusted according to the generation rate for generating the cryptographic key using the quantum key distribution technology;
   performing a flow control that includes a first flow control and a second flow control,
      the flow control being performed with respect to the data, the communication of which is permitted;
      the first flow control performing, if the cryptographic key has not been provided at time of reception of the data with which the traffic control is performed, with respect to the received data, an operation selected from among:
         a first operation of destroying the data,
         a second operation of holding the data, and
         a third operation of attaching, to the data, information indicating that the cryptographic key has not been provided, and then outputting the data,
      the second flow control outputting the received data if the cryptographic key is provided at time of the reception of the data with which the traffic control is perfoi led; and
   performing, with respect to data with which the flow control is performed, cryptography processing using the cryptographic key.

7. A communication system comprising:
   a generation device that generates a cryptographic key using quantum key distribution technology; and
   a communication device, wherein
   the communication device includes
      one or more hardware processors configured to:
      provide the cryptographic key generated by the generation device,
      perform a traffic control with respect to data for cryptography processing, the traffic control controlling permission for communication of the data, the traffic control being a first traffic control based on a token bucket method in which a token is used that corresponds to a generation rate for generating the cryptographic key using the quantum key distribution technology or a second traffic control based on a leaky bucket method in which a leakage amount is adjusted according to the generation rate for generating the cryptographic key using the quantum key distribution technology;
      perform a flow control that includes a first flow control and a second flow control,
         the flow control being performed with respect to the data, the communication of which is permitted;
         the first flow control performing, if the cryptographic key has not been provided at time of reception of the data with which the traffic control is performed, with respect to the received data, an operation selected from among:
            a first operation of destroying the data,
            a second operation of holding the data, and
            a third operation of attaching, to the data, information indicating that the cryptographic key has not been provided, and then outputting the data,
         the second flow control outputting the received data if the cryptographic key is provided at time of the reception of the data with which the traffic control is performed; and
      perform with respect to data with which the flow control is performed, the cryptography processing using the cryptographic key.

* * * * *